LOUIS McMURRAY & ROBERT J. HOLLINGSWORTH.
Improvement in Soldering-Irons.
No. 127,499.  Patented June 4, 1872.
Fig. 1.
Fig. 2.
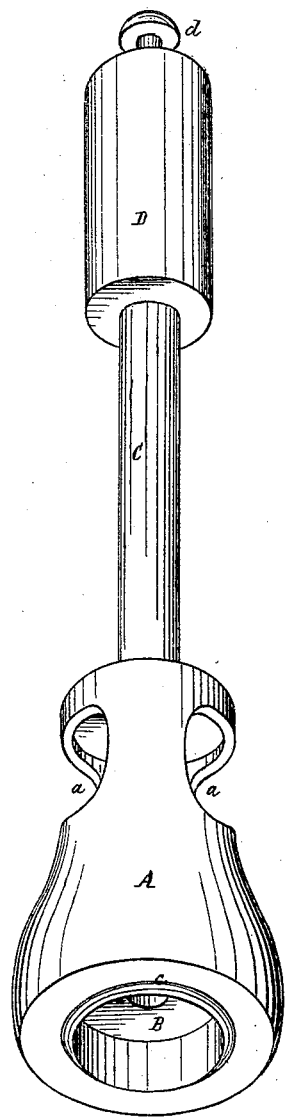
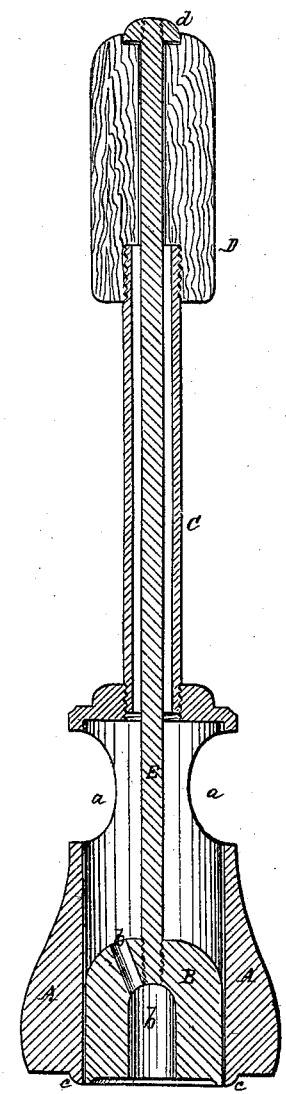
Witnesses
C B Nottingham
J R Nottingham
Inventors.
Louis McMurray &
Robt. J. Hollingsworth by
A Pollok their atty

127,499

UNITED STATES PATENT OFFICE.

LOUIS McMURRAY AND ROBERT J. HOLLINGSWORTH, OF BALTIMORE, MD.

IMPROVEMENT IN SOLDERING-IRONS.

Specification forming part of Letters Patent No. 127,499, dated June 4, 1872.

*To whom it may concern:*

Be it known that we, LOUIS MCMURRAY and ROBERT J. HOLLINGSWORTH, both of the city and county of Baltimore and State of Maryland, have invented certain new and useful Improvements in Soldering-Irons for soldering caps on cans, of which the following is a specification:

Our present improvements have relation to the construction of the metallic soldering-block of a soldering-iron, particularly of the base of the block, or that portion nearest the top of the can in the operation of soldering the cap. Our object is to effect the retention of heat in the soldering lip or flange that enters the annular solder-groove in the top of the can around the cap, and also to insure the melting of all the solder and the carrying it into the solder-groove, even if it should not have been accurately or wholly placed therein in the first instance.

In the accompanying drawing, Figure 1 is a perspective view, and Fig. 2 a vertical central section of a soldering-iron made in accordance with our invention.

A is the soldering-block, cored out cylindrically for the greater part of its length to receive the presser or holder B, which is of like cylindrical form, fitting snugly within the block and capable of freely sliding up and down therein. In the upper part of the block are lateral openings *a*, and the holder has formed through it passage *b* in the usual manner. This arrangement of openings in the block and passage in the holder we do not, however, here claim, and it forms no part of these improvements. The block is considerably thickened at its base, as shown, so as to extend out quite a distance beyond the annular lip or flange *c*, the under face or bottom of the block around the flange being a plane surface, and the general conformation of this face, including the plane surface and the flange, being such as to allow it to fit or conform to the top of the can to which the tool is designed to be applied. This overhanging portion of the block not only causes the heat to be retained for a greater length of time in the lip *c*, but it also serves another purpose. It sometimes happens that the solder-ring is not placed properly in the groove in the top of the can around the cap, so that when the soldering-iron descends and its flange enters the groove the ring will be cut and a segment of it, of greater or less size, will remain outside the groove. In case the block is of the ordinary construction, this external portion of solder will remain unmelted, but when it is formed as we have described the flat surface around the flange will be brought in contact with and melt this solder, which, by the turning of the tool, will be, to a great extent, carried into the solder-groove. This exterior flat surface also serves to steady the tool and to prevent the flange entering the groove more deeply on one side than on the other; and, being on the exterior of the flange, it allows the whole of the cylindrical space within the block to be used to contain a presser or holder, B, of a shape hereinafter described, so as to be adapted to fit on and around the cap. This holder, which rests by gravity on the cap of the can and moves freely up and down in the soldering-block, is an improvement on our patent of June 6, 1871, No. 115,760. In that patent the holder is a simple rod; but in the present instance we construct the lower end of the holder of a size to fit the cylindrical bore of the soldering-block, the diameter of which is slightly in excess of the diameter of the can-cap. The bottom of the holder B is shaped, as shown, not only to fit upon the top, but also to extend down upon the sides of the cap. This formation is advantageous, for the top and sides of the cap are held while the solder is being applied; and, moreover, it allows the tool to be more readily adjusted on the cap, for when applying the tool to the top of the can, even if the flange *c* does not enter the groove in the first instance, by moving the tool in the proper direction the holder will at last drop over and rest on the cap, thus becoming the means of assuring the soldering-tool in its proper position. For this purpose the holder should be so arranged that when in its lowest position its bottom will drop a little below the flange *c* of the block. The soldering-block is provided with a hollow stem, C, and handle D. The presser or holder is held within the block by means of a rod, E, attached to its upper end and extending out through the top of the handle, where it is provided with a button, *d*, which prevents the presser from dropping out from the block or falling below the flange *c* further than the distance above specified.

Having described our improvements, what we claim, and desire to secure by Letters Patent, is—

A tool for soldering caps on cans in which the soldering-block is thickened at its base around the soldering-lip or flange and formed on its bottom with a surface conforming to the top of the can, as herein shown and set forth.

In testimony whereof we have signed our names to this specification before two subscribing witnesses.

LOUIS McMURRAY.
ROBERT J. HOLLINGSWORTH.

Witnesses:
TH. HARRIS HODGES,
H. C. PRIMING.